Jan. 24, 1961 J. P. MULLEN 2,968,968
BALL EJECTION CONTROLLED DETENT
Filed May 19, 1959
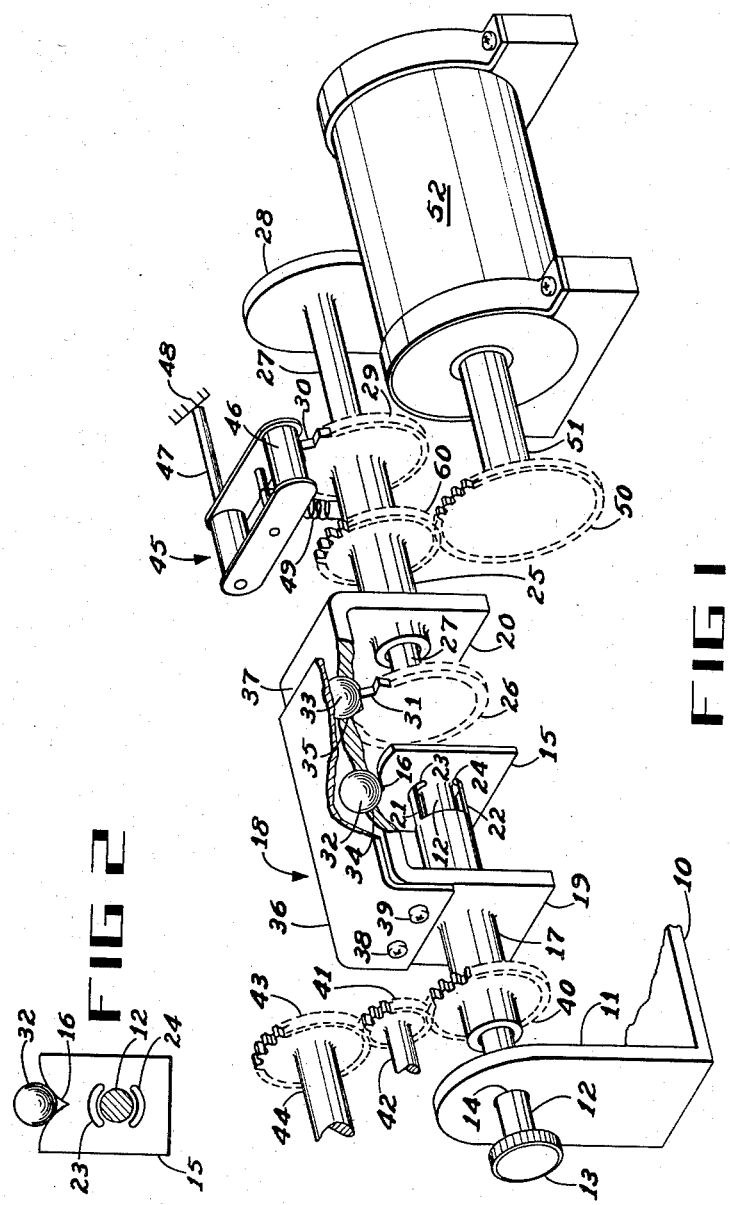
INVENTOR.
JOE P. MULLEN
BY
ATTORNEY
AGENT

United States Patent Office 2,968,968
Patented Jan. 24, 1961

2,968,968

BALL EJECTION CONTROLLED DETENT

Joe P. Mullen, Cedar Rapids, Iowa, assignor to Collins Radio Company, Cedar Rapids, Iowa, a corporation of Iowa Filed May 19, 1959, Ser. No. 814,234

5 Claims. (Cl. 74—527)

This invention relates generally to detent mechanisms and more particularly to a detent controlled shaft positioning mechanism wherein wear on the detent is minimized by relieving the force on the detent during repositioning cycles.

In shaft positioning systems commonly employed in the art, detent mechanisms are ofttimes employed to achieve accurate control of incremental step shaft positions by employing various "click" mechanisms whereby a spring-loaded member engages in indentation to effect a positive step position control of a shaft. In devices such as tuning mechanisms for radio apparatus, it is generally desirable and ofttimes imperative that the detented shaft position be maintained with an extreme degree of accuracy. With conventional detent mechanisms, rotation of the shaft forcibly ejects the detent follower. Thus, during rotation of the shaft to successive detent positions, a continual force is applied between detent follower and the detent defining member which may cause undue wear in the detent mechanism with subsequent loss of accuracy in the detented shaft positions. Such detent systems inherently require an increased torque to be applied in turning the shaft in proportion to the firmness that the follower is to define a given position. In turn, as the firmness of the detent is increased, the wear on the detent mechanism with subsequent loss of positioning accuracy becomes more evident. Thus the maintenance of positive firm detented positions necessitates an increased torque requirement for shaft rotation along with a subsequent increase in wear in the detent mechanism.

It is an object, therefore, of the present invention to provide an improved detent mechanism in which wear is minimized by relieving the force on the detent during the repositioning process.

It is a further object of the present invention to provide a force-controlled detent mechanism wherein means are provided to remove the primary detent loading during a repositioning operation.

Still a further object of the present invention is the provision of a detent mechanism wherein the firmness of the detent does not proportionally necessitate an increased torque for repositioning operations and in which the accuracy of the detent position may be maintained over a much longer period of time.

Still another object of the present invention is the provision of a force-controlled detent mechanism in which the clocking action between initial and final positions of the detent is substantially eliminated. The present invention is featured in the provision of a secondary torque actuated means by which the primary loading on the detent is removed during the application of actuating torque in either direction of rotation.

These and other objects and features of the invention will become apparent from the following description and claims when read in view of the accompanying drawings, in which:

Figure 1 is a functional mechanical representation of an illustrative embodiment of the present invention; and Figure 2 is a plan view of the cam plate member employed in the embodiment of Figure 1.

As outlined, the present invention provides a detent mechanism by which the primary loading on the detent is removed during the repositioning cycle. During the continued application of a predetermined torque to the input of the detent mechanism to be described, rotation of the output shaft is effected without the positive application of the detent as the shaft is rotated through subsequent detent defined positions. Upon the removal of the turning torque, the system inherently applies the primary loading to the detent mechanism so as to effect a firm positive detent to accurately position the output shaft.

With reference to Figure 1, the detent mechanism of the present invention is illustrated as being incorporated between an input tuning knob 13 and a tuned element 52 which might, for example, be a permeability tuned oscillator which is to be step-tuned in accordance with incremental step rotation of an input tuning shaft 51. Input tuning knob 13 is rigidly affixed to an input driving shaft 12, the latter being rotatably received in an upright bracket member 11 carried by a base plate 10. A second shaft 27 is rigidly affixed to a second upright bracket member 28 which might be similarly carried by a common base plate 10. The other end of fixed shaft 27 is rigidly and nonrotatably affixed to a star wheel member 26. Star wheel 26 forms the positive detent-defining member of the present invention in conjunction with a spring-loaded ball 33 which communicates successively with a plurality of angular indentations 31 formed about the periphery of star wheel 26. Fixed shaft 27 and input driving shaft 12 are coaxial. A first sleeve member 17 is mounted rotatably and concentrically about input tuning shaft 12 and a second sleeve member 25 is mounted rotatably and concentrically about fixed shaft 27. Sleeve members 17 and 25 collectively carry a U-shaped carrier frame generally designated by reference numeral 18. Carrier frame 18 includes a face member 37 parallel to the common axis of input shaft 12 and fixed shaft 27 and radially displaced therefrom by means of end members 19 and 20 rigidly affixed to sleeve members 17 and 25 respectively. The face member 37 of carrier frame 18 is then seen to be carried in an offset rotary position with respect to the axis of star wheel 26 by means of the rotation of sleeve members 17 and 25 about the driving axis.

Face member 37 of carrier frame 18 is formed with through-holes 34 and 35 into which are received detent ball members 32 and 33 respectively. Ball member 33 is urged into spring-loaded contact with the indentations 31 in star wheel 26 by means of a spring member 36 which might be rigidly affixed to the carrier frame member 18 by means of fasteners 38 and 39. Ball member 33 is then carried in the carrier frame such that it may be readily displaced with respect to fixed shaft 27, but confined to relative motion only such that it is held in spring-loaded engagement with the periphery of star wheel 26.

Carrier frame member 18 additionally carries a second longitudinally-disposed ball member 32 received in through-hole 34 such that it is similarly held in spring-loaded engagement with a cam plate 15, which cam plate is rigidly affixed to, and thus rotates with, input shaft 12. Cam plate 15 is formed with a peripheral indentation 16 into which, in the absence of the application of torque to the input shaft 12, the ball member 32 is held in spring-loaded engagement. Cam plate 15 communicates with sleeve member 17 by means of a lost-motion coupling means comprised of slots 23 and 24 in conjunction with pins 21 and 22 longitudinally extended from sleeve member 17. The slots 23 and 24 formed in cam plate 15, as illustrated in Figure 2, are formed as circumferential segments about a radius defined substantially by that of sleeve member 17 such that the extensions or pin members 21 and 22 from sleeve member 17 are received respectively in the slots 23 and 24 and permit a predetermined rotation of the cam plate 15 with respect to sleeve member 22 during which no motion is transmitted therebetween.

The arrangement between cam plate 15 and star wheel 26 is such that the detented slot 16 in cam plate 15 lies in axial alignment with one of the detent slots in star wheel 26 such that the detent mechanism as illustrated in Figure 1 is in a rest position wherein a firm detent is maintained between carrier frame 18 and star wheel 26.

The detent output position of the detent mechanism is thus seen to be the angular position of the carrier frame member 18, and thus sleeve member 25, with respect to the fixed shaft 27. Thus in the embodiment illustrated, shaft output motion is taken from sleeve member 25 by means of a driving gear 60 rigidly affixed thereto and in engagement with a driven gear 50 rigidly affixed to the tuning shaft 51 of the tuned member 52. A second output might be taken in accordance with the rotation of the carrier frame member 18 with respect to fixed shaft 27 by means of a drive gear 40 rigidly affixed to sleeve 17 which through engagement with gear members 41 and 43, provides an output position to a shaft 44 which might, for example, position an indicator device calibrated in terms of the tuned device 52.

Rotation of the input knob 13 will affect the ultimate rotation of the output shafts 44 and 51 to detent-defined positions as defined by the cooperation between ball member 33 and star wheel 26 and remove the positive detent action between ball member 33 and star wheel 26 as long as torque is maintained on input knob 13. This operation is effected as follows:

Initial rotation of input knob 13 transmits a like-rotation through shaft 12 to cam plate 15. No initial rotary action is imparted to the output shafts 44 and 51 since initially no torque is imparted between input shaft 12 and the sleeve members 17 and 25 which ultimately drive the output shafts. The system loading imparted through the gear drives from the output shafts 44 and 51 is sufficient to hold the sleeve members 17 and 25 and carrier frame member 18 stationary with respect to the base plate 10 while a camming action is effected between cam plate 15 and ball member 32 to force ball 32 radially outwardly from the axis of shaft 12. Ball 32 is thus forced against the spring member 36 to raise spring member 36 with respect to the face plate 37 of carrier frame member 18 and the spring loading between spring member 36 and the detent ball 33 is thus removed. During this initial turning of input shaft 12, no positive torque is applied to the carrier frame member 18 until the relative rotation of the cam plate 15 with respect to sleeve member 17 is such that the pin members 21 and 22 on sleeve 17 engage the extremes of the lost motion slots 23 and 24 in cam plate 15. As this degree of rotation is reached, a positive torque is directly imparted from cam plate member 15 to the pin members 21 and 22 to effect like rotation of the sleeve member 17 with input shaft 12; that is, sleeve member 17 follows the rotation of input shaft 12, it being understood that the input torque applied to shaft 12 is sufficient to overcome the system loading imparted from the driven shafts 51 and 44 through the gear trains back through the sleeve member 17. The spring loading between the carrier frame member 18 and the cam plate 15 is inherently less than the system loading such that the camming action between the cam plate 15 and ball 32 is effected during the takeup of the lost motion between the input shaft 12 and the sleeve member 17. Thus the application of torque to input shaft 12 first effects a camming action between camming plate 15 and ball member 32 to raise the spring member 36 with respect to the face plate 37 of carrier frame member 18 and, subsequently, the input torque is imparted positively through pin members 21 and 22 and the lost-motion slots in cam plate 15 to overcome the system loading and to force the rotation of carrier frame member 18 with respect to star wheel 26 in accordance with the rotation of input shaft 12. During such rotation, no positive detent action is realized between primary detent ball 33 and star wheel 26 since the spring member 36 is held out of spring-loaded engagement with detent ball 33 during the radial displacement of ball 32 with respect to the shaft axis. It is thus seen that during repositioning of the system no detent action or clicking action is realized between input shaft 12 and sleeve members 17 and 25. Yet upon removing the turning torque on input shaft 12, the spring member 36 forces ball member 32 into the depression 16 on cam member 15, thus applying loading from spring member 36 between detent ball 33 and star wheel 26 to define a positive incremental detented position. Wear between detent ball 33 and the tooth members 31 of star wheel 26 is thus held to a minimum since the spring loading to effect this detent operation is removed during the actual repositioning of the system. The accuracy of the detent may then be maintained over a considerable period of time since no undue wear is effected between detent ball 33 and spring member 36 during repositioning. Manual rotation of the input positioning knob 13 is considerably eased by the elimination of repetitive detent action between initial and final positions as is experienced in conventional detent systems.

The system described may additionally include a drag member generally designated by reference numeral 45 which comprises a follower member 46 pivoted about a shaft 47 which is functionally indicated as being rigidly affixed at one end 48. Sleeve member 25 might then carry an additional star wheel 29 formed with peripheral teeth 30 into which follower member 46 is held in spring-loaded engagement by means of a spring 49, the latter being affixed to base member 10. The drag member provides a secondary detent-like loading on the system wherein a less firm detent position corresponding to each of the positive detent positions defined by star wheel 26 may be realized to impart a "feel" to the system during repositioning such that the desired final position may be defined before release of input knob 13. It is understood that each of the grooves 30 in the drag member star wheel 29 would be of lesser depth than the corresponding detent depressions 31 in star wheel 26 and that the drag member 45 in conjunction with star wheel 29 imparts a secondary detent which is independent of the positive detent action which ultimately effects and controls output shaft positions. Wear between the follower member 46 of drag member 45 and star wheel 29 is of little significance and does not affect the accuracy of the primary detent operation of the mechanism.

It is to be realized that the present invention resides in the cooperation between fixed and relatively rotatable mechanical elements and is not to be limited to the actual mechanical combination illustrated. For example, for the purpose of the application of rotational motion to the driven members, it is immaterial whether the output shafts are driven from sleeve members 17 or 25 or that the carrier frame member 18 be as illustrated, it being essential only that the carrier frame member 18 provides a means of effecting spring loading between the ball members 32 and 33 and cam plate 15 and star wheel 26 respectively, while permitting a relative rotation between the ball members and the detent defining members.

The present invention is thus seen to provide a force-controlled detent mechanism in which the primary detent loading is removed during repositioning cycles such that no undue wear is caused in the primary detent mechanism and in which repositioning is eased due to the elimination of repetitive clicking during repositioning. The present invention accordingly provides a detent mechanism which is effectively disengaged during repositioning, but positively applied to ultimately define the new position.

Although this invention has been described with respect to a particular embodiment thereof, it is not to be so limited as changes and modifications may be made therein which are within the full intended scope of the invention as defined by the appended claims.

I claim:

1. A detent mechanism comprising an input shaft rotatably supported with respect to a base member, a detent cam plate rigidly affixed to said input shaft, a circumferential detent defining member rigidly affixed with respect to said base member and carried in displaced axial alignment with said cam plate, a carrier frame member rotatably supported about said input shaft, said frame member including a face plate substantially parallel to said input shaft and carried in offset rotary position with respect to said cam plate and said detent defining member, first and second ball members carried in through-holes formed in said face plate, a spring-loading means affixed to said face plate, said spring-loading means commonly engaging each of said first and second detent balls, a cooperative pin and slot coupling means operably connected between said carrier frame and said cam plate respectively, said coupling means adapted to permit a preselected bidirectional relative rotation between said carrier frame and said cam plate with respect to a neutral position defined by the detent in said cam plate periphery, said spring-loading means and first ball member coactively adaptable such that camming action therebetween is effected responsive to relative rotation between said cam plate and said carrier frame and said spring-loading means is thereby removed from said second ball member to effectively remove the detent action between said second ball member and said second detent defining member.

2. A detent mechanism comprising an input shaft rotatably supported with respect to a base member, a cam plate including a peripheral detent, said cam plate rigidly affixed perpendicularly to said input shaft, a circumferential detent defining member rigidly affixed with respect to said base member and carried in longitudinal displaced coaxial alignment with said cam plate, said detent defining mechanism including a plurality of detents formed radially inwardly from the periphery thereof, a carrier frame member rotatably supported about said input shaft and including a face plate radially displaced from and parallel to the longitudinal axis of said input shaft and carried in offset rotary position with respect to said cam plate and said detent defining mechanism, first and second ball members carried in through-holes longitudinally disposed in said face plate, a spring-loading means affixed to said face plate, said spring-loading means commonly engaging each of said first and second detent balls to urge said first ball into detented engagement with said cam plate detent and said second ball into detented engagement with one of said plurality of detents on said detent defining member, a cooperative pin and arcuate slot coupling means operably effected between said carrier frame and said cam plate respectively, said coupling means adapted to permit a preselected bidirectional relative rotation between said carrier frame and said cam plate with respect to a neutral position defined by the detent in said cam plate periphery, said spring-loading means and first ball means coactively adaptable such that camming action therebetween is effected responsive to said relative rotation between said cam plate and said carrier frame and said spring-loading means is thereby urged substantially radially outwardly from said second ball member to effectively remove the detent action between said second ball member and said second detent defining member.

3. A detent mechanism comprising an input shaft rotatably supported with respect to a base member, a circumferential detent defining member rigidly affixed with respect to said base member and axially aligned with the longitudinal axis of said input shaft, a cam plate rigidly affixed to said input shaft and formed with a radially inwardly disposed peripheral detent therein, a sleeve member rotatably mounted concentrically about said input shaft, a carrier frame member rigidly affixed to said sleeve member and including a face member radially displaced with respect to the longitudinal axis of said input shaft, said face member extending longitudinally into radially displaced juxtaposition with respect to the peripheries of said detent defining member and said cam plate, a first ball member received in a through-hole formed in said face member and carried in peripheral engagement with said cam plate detent, a second ball member similarly received in a second through-hole in said face member and in peripheral engagement with said detent defining member, a spring member mounted on said face plate and extending into spring-loaded engagement with the peripheries of each of said first and second ball members, pin means extending longitudinally from said first sleeve member and communicating with through-slot means formed in said cam plate, said slot means formed as a predetermined arcuate segment whereby a predetermined relative rotation of said cam plate with respect to said sleeve member is enabled, output load means connected to said sleeve member, said load means defining a rotational torque requirement exceeding that of said first ball and cam plate detent loading whereby rotation of said input shaft effects and holds a camming action between said first ball member and said cam plate to radially outwardly displace said spring member with respect to said face member and thereby relieve the loading between said spring member and said second ball member.

4. A detent mechanism comprising an input shaft rotatably supported with respect to a base member, a circumferential detent defining member nonrotatably carried with respect to said base member and axially aligned with the longitudinal axis of said input shaft, a cam plate rigidly affixed perpendicularly to said input shaft and formed with a radially inwardly disposed peripheral detent therein, said cam plate carried in longitudinal displacement with respect to said detent defining member, a sleeve member rotatably mounted concentrically about said input shaft, a carrier frame member rigidly affixed to said sleeve member and including a face member radially displaced with respect to the longitudinal axis of said input shaft, said face member extending longitudinally into radially displaced juxtaposition with respect to the peripheries of said detent defining member and said cam plate, a first ball member received in a through-hole formed in said face member and carried in peripheral engagement with said cam plate detent, a second ball member similarly received in a second through-hole in said face member and in peripheral engagement with said detent defining member, a flat spring member having one end thereof affixed on said face plate and extending therefrom into successive spring-loaded engagement with the peripheries of said first and second ball members respectively, pin means extending longitudinally from said first sleeve member and communicating with through-slot means formed in said cam plate, said slot means formed as a predetermined arcuate segment whereby a predetermined relative rotation of said cam plate with respect to said sleeve member is enabled, output load means connected to said sleeve member, said load means defining a rotational torque requirement exceeding that of said first ball and cam plate detent loading whereby rotation of said input shaft effects and holds a camming action between said first ball member and said cam plate to radially outwardly displace said spring member with respect to said face member and thereby relieve the loading between said spring member and said second ball member.

5. A detent mechanism comprising an input shaft rotatably supported with respect to a base member, a circumferential detent defining member nonrotatably carried with respect to said base member and axially aligned with the longitudinal axis of said input shaft, a cam plate rigidly affixed perpendicularly to said input shaft and formed with a radially inwardly disposed peripheral detent therein, said cam plate carried in longitudinal displacement with respect to said detent defining member, a member rotatably mounted concentrically about said input shaft, a carrier frame member rigidly affixed to said sleeve member and including a face member radially displaced with respect to the longitudinal axis of said input shaft, said face member extending longitudinally into radially displaced juxtaposition with respect to the peripheries of said detent defining member and said cam plate, a first ball member received in a through-hole formed in said face member and carried in peripheral engagement with said cam plate detent, a second ball member similarly received in a second through-hole in said face member and in peripheral engagement with said detent defining member, a flat spring member having one end thereof affixed on said face plate and extending therefrom into successive spring-loaded engagement with the peripheries of said first and second ball members respectively, pin means extending longitudinally from said first sleeve member and communicating with through-slot means formed in said cam plate, said slot means formed as a predetermined arcuate segment whereby a predetermined relative rotation of said cam plate with respect to said sleeve member is enabled, a further circumferential detent member rigidly affixed to said sleeve member, detent follower means communicating with said further detent member, means for spring loading said detent follower radially inwardly with respect to said further detent member, said further detent member and follower means adapted to effect a plurality of secondary detents equal that of said primary detent defining member and of substantially lesser restraint, output load means connected to said sleeve member, said load means and said secondary detent means collectively defining a rotational torque requirement exceeding that of said first ball and cam plate detent loading whereby rotation of said input shaft effects and holds a camming action between said first ball member and said cam plate to radially outwardly displace said spring member with repect to said face member and thereby relieve the loading between said spring member and said second ball member.

References Cited in the file of this patent

UNITED STATES PATENTS 2,107,373     Edwards _____ Feb. 8, 1938

FOREIGN PATENTS 837,016     Germany _____ Apr. 17, 1952